US012700638B2

(12) United States Patent

Thipphavong et al.

(10) Patent No.: US 12,700,638 B2

(45) Date of Patent: Aug. 4, 2026

(54) HIGH VOLTAGE BATTERY SYSTEM WITHOUT STANDALONE PACK ENCLOSURE

(71) Applicant: Atieva, Inc., Newark, CA (US)

(72) Inventors: Adam Thipphavong, San Jose, CA (US); James Hawkins, Fremont, CA (US); Harrison Senor, Newark, CA (US); Axel Boris Vollmer, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 459 days.

(21) Appl. No.: 18/341,354

(22) Filed: Jun. 26, 2023

(65) Prior Publication Data

US 2024/0006701 A1      Jan. 4, 2024

Related U.S. Application Data

(60) Provisional application No. 63/367,248, filed on Jun. 29, 2022.

(51) Int. Cl.
| | |
|---|---|
| *H01M 50/249* | (2021.01) |
| *B60L 50/60* | (2019.01) |
| *B60L 50/64* | (2019.01) |
| *B60L 58/20* | (2019.01) |

(52) U.S. Cl.
CPC ........... *H01M 50/249* (2021.01); *B60L 50/64* (2019.02); *B60L 50/66* (2019.02); *B60L 58/20* (2019.02)

(58) Field of Classification Search
CPC ........................ B60L 50/64; B60K 2001/0438
See application file for complete search history.

(56) References Cited

U.S. PATENT DOCUMENTS

| | | | | |
|---|---|---|---|---|
| 4,365,681 | A | * 12/1982 | Singh ..................... | B60L 50/64 |
| | | | | 180/68.5 |
| 10,017,037 | B2 * | 7/2018 | Newman ............. | H01M 50/271 |
| 10,944,089 | B2 * | 3/2021 | Hildinger ........... | H01M 50/209 |
| 12,438,215 | B2 * | 10/2025 | Thayer .............. | H01M 10/6568 |

(Continued)

FOREIGN PATENT DOCUMENTS

| | | |
|---|---|---|
| CN | 108454366 A | 8/2018 |
| DE | 102020126398 A1 | 4/2022 |

OTHER PUBLICATIONS

Wikipedia: "High Voltage," available online at <https://en.wikipedia.org/wiki/High_voltage>, Dec. 25, 2021, 9 pages.

(Continued)

*Primary Examiner* — Brian L Swenson
(74) *Attorney, Agent, or Firm* — Brake Hughes Bellermann LLP

(57) ABSTRACT

An electric vehicle comprises: a vehicle body; a cavity in the vehicle body, the cavity formed by at least one wall of the vehicle body and by an opening in the vehicle body; a closure configured for closing the opening; an electric motor for propulsion of the electric vehicle; and components that comprise a high voltage battery system, the components mounted to the vehicle body inside the cavity, the high voltage battery system including electrochemical cells powering the electric motor, the high voltage battery system being enclosed by the wall of the vehicle body and the closure and having no standalone pack enclosure.

16 Claims, 6 Drawing Sheets

(56)     References Cited

U.S. PATENT DOCUMENTS

| | | | |
|---|---|---|---|
| 2008/0311468 A1 | 12/2008 | Hermann et al. | |
| 2014/0272501 A1* | 9/2014 | O'Brien | B60L 50/64 |
| | | | 429/90 |
| 2017/0267120 A1* | 9/2017 | Takizawa | B60L 15/007 |
| 2019/0326582 A1 | 10/2019 | Berels et al. | |
| 2020/0130511 A1* | 4/2020 | Botts | B60L 58/22 |
| 2021/0159567 A1 | 5/2021 | Pires et al. | |
| 2023/0058367 A1* | 2/2023 | Dawson | H01M 50/502 |
| 2023/0339302 A1* | 10/2023 | Bilinski | B62D 25/2036 |
| 2025/0233232 A1* | 7/2025 | Li | H01M 50/30 |

OTHER PUBLICATIONS

International Search Report and Written Opinion for PCT Application No. PCT/US2023/069073, mailed on Oct. 17, 2023, 20 pages.

* cited by examiner

700

702 — Remove closure

704 — Remove electrical interconnect

600

602 — Form cavity

604 — Mount electric motor

606 — Mount HV battery pack inside cavity

608 — Close opening with closure

HIGH VOLTAGE BATTERY SYSTEM WITHOUT STANDALONE PACK ENCLOSURE

CROSS-REFERENCE TO RELATED APPLICATION

This application claims benefit, under 35 U.S.C. § 119, of U.S. Provisional Patent Application No. 63/367,248, filed on Jun. 29, 2022, entitled "HIGH VOLTAGE BATTERY SYSTEM WITHOUT STANDALONE PACK ENCLOSURE," the disclosure of which is incorporated by reference herein in its entirety.

TECHNICAL FIELD

This document relates to a high voltage battery system without a standalone pack enclosure.

BACKGROUND

In recent years, the world's transportation has begun a transition away from powertrains primarily driven by fossil fuels and toward more sustainable energy sources. The majority of such increasingly prevalent powertrains include electric motors powered by on-board energy storages. In order to make these new modes of transportation available to larger segments of population, vehicle makers are striving to reduce the cost of manufacturing, assembling and maintaining electric vehicles.

SUMMARY

In a first aspect, an electric vehicle comprises: a vehicle body; a cavity in the vehicle body, the cavity formed by at least one wall of the vehicle body and by an opening in the vehicle body; a closure configured for closing the opening; an electric motor for propulsion of the electric vehicle; and components that comprise a high voltage battery system, the components mounted to the vehicle body inside the cavity, the high voltage battery system including electrochemical cells powering the electric motor, the high voltage battery system being enclosed by the wall of the vehicle body and the closure and having no standalone pack enclosure.

Implementations can include any or all of the following features. The high voltage battery system comprises first and second modules of electrochemical cells, and an electrical interconnect that electrically connects the first and second modules to each other. Each of the first and second modules has a fraction of a high voltage of the high voltage battery system. The electrical interconnect comprises a busbar partially covered by insulation. Each of the first and second modules includes circuitry controlling the electrochemical cells of the respective first or second module. Each of the first and second modules has a rectilinear shape with main surfaces of the rectilinear shape opposing each other, wherein normal directions of each of the main surfaces are substantially parallel with a normal direction of the opening in the vehicle body. The first and second modules are mounted side by side within the cavity with their main surfaces substantially aligned with each other. The first and second modules are stacked within the cavity with their main surfaces substantially facing each other. Each of the first and second modules has a rectilinear shape with main surfaces of the rectilinear shape opposing each other, wherein normal directions of each of the main surfaces are not substantially parallel with a normal direction of the opening in the vehicle body. The normal directions of each of the main surfaces are substantially perpendicular to the normal direction of the opening in the vehicle body. The first and second modules are stacked within the cavity with their main surfaces substantially facing each other. The cavity is formed by at least five walls of the vehicle body. The five walls include a rear wall facing the opening, and four side walls substantially perpendicular to the rear wall. The opening faces toward ground on which the electric vehicle is positioned. The electric vehicle further comprises a gap separating the electrochemical cells from the closure.

In a second aspect, a method of manufacturing an electric vehicle comprises: forming a cavity in a vehicle body by at least one wall of the vehicle body and by an opening in the vehicle body; mounting an electric motor to the electric vehicle for propulsion of the electric vehicle; mounting components that comprise a high voltage battery system to the vehicle body inside the cavity, the high voltage battery system including electrochemical cells for powering the electric motor; and closing the opening with a closure, the high voltage battery system being enclosed by the wall of the vehicle body and the closure and having no standalone pack enclosure.

Implementations can include the following feature. Mounting the components to the vehicle body inside the cavity comprises: mounting first and second modules of electrochemical cells inside the cavity; and installing an electrical interconnect that electrically connects the first and second modules to each other.

In a third aspect, a method of servicing an electric vehicle comprises: removing a closure that closes an opening in a vehicle body of the electric vehicle, a cavity in the vehicle body formed by the opening and at least one wall of the vehicle body, wherein components that comprise a high voltage battery system are mounted to the vehicle body inside the cavity, the high voltage battery system comprising at least first and second modules of electrochemical cells; and removing from the high voltage battery system an electrical interconnect that electrically connects the first and second modules to each other.

Implementations can include any or all of the following features. Removing the electrical interconnect comprises pulling while grasping an insulated portion of the electrical interconnect. The method further comprises: subsequently installing the electrical interconnect to electrically connect the first and second modules to each other; and after subsequently installing the electrical interconnect, closing the opening with the closure.

BRIEF DESCRIPTION OF DRAWINGS

Like reference symbols in the various drawings indicate like elements.

DETAILED DESCRIPTION

Figure 1:
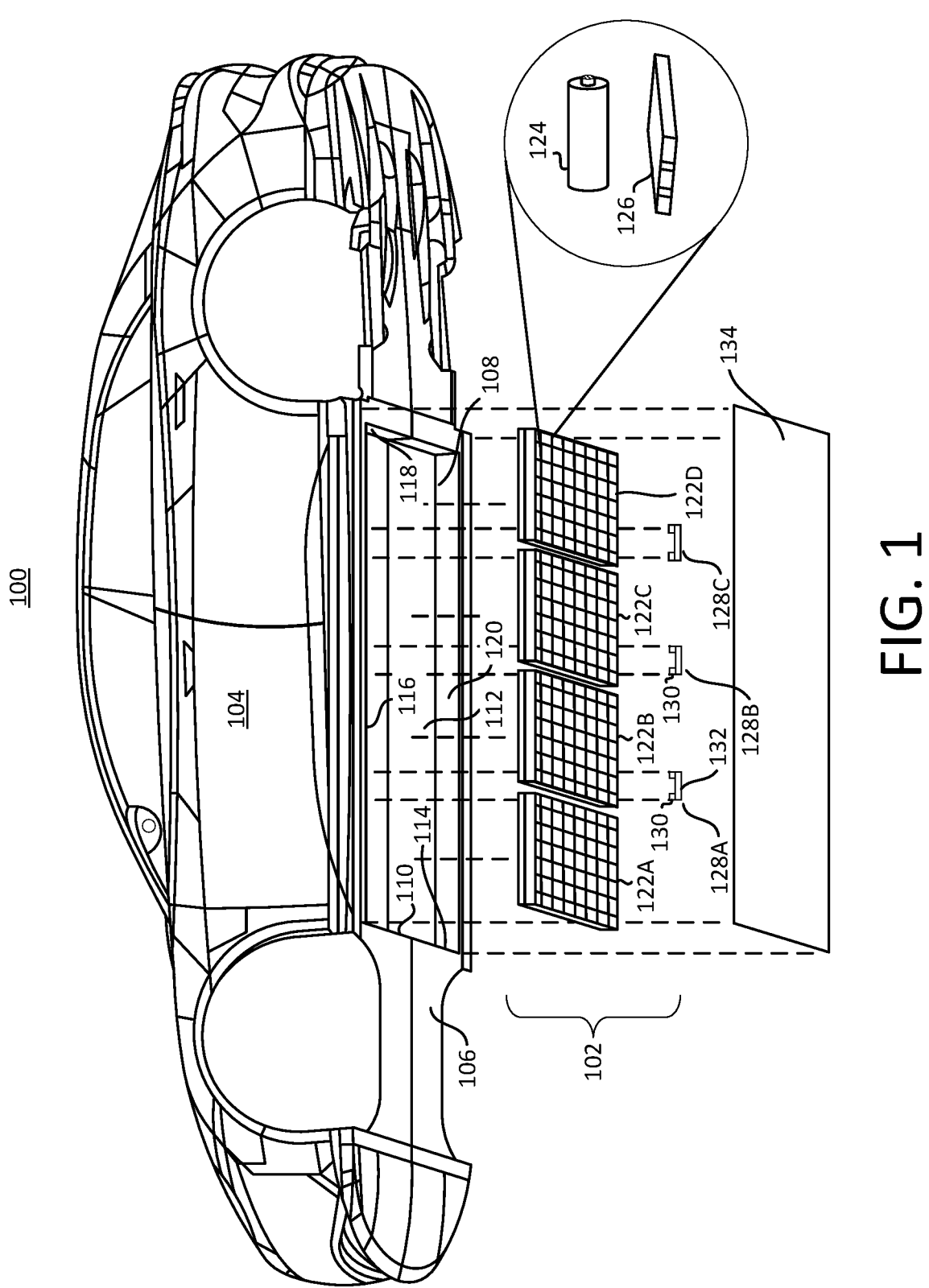
FIG. 1 shows an example of an electric vehicle (EV) having a high-voltage (HV) battery system with no standalone pack enclosure.

This document describes examples of systems and techniques for providing an electric vehicle (EV) with a battery system that has no standalone pack enclosure. This can reduce the mass of the EV, or allow the EV to carry more electrochemical cells at the same mass, or reduce the manufacturing process of a standalone pack assembly, to name just a few examples. The ability of providing a high voltage battery system without a standalone pack enclosure can be enabled by ensuring that the high voltage battery system is nevertheless serviceable without special high voltage tools or high voltage training. For example, with a high voltage battery system this can mean ensuring that service personnel would only encounter terminals or other conductive elements that have a non-lethal potential difference (e.g., that are of a lower voltage than the high voltage battery system). In some implementations, a high voltage battery system is provided that is vehicle mounted, structural, and electrically isolated, and that does not have a removable standalone enclosure. Modules can be structurally integrated to a vehicle body. Electrical interconnects and battery support systems can be assembled directly into the vehicle assembly—that is, without first assembling them into a standalone pack enclosure—to complete the vehicle-mounted high voltage battery energy storage system. The absence of a standalone pack enclosure means that the entire battery system cannot be removed from the EV as a single self-contained unit. Rather, the different components of the battery system can be separately and independently removed from the EV for service or replacement.

Examples herein refer to a battery system for an EV, which is an assembly of electrochemical cells configured to power an electric motor for propulsion of the EV. Examples herein refer to a battery module, which is an individual component configured for holding and managing multiple electrochemical cells during charging, storage, and use. A battery system can include any number of modules. The battery module can be intended as the sole power source for one or more loads (e.g., electric motors), or more than one battery module of the same or different type can be used. Two or more battery modules can be implemented in a system where the battery system has no standalone enclosure. For example, a battery system can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a battery system having high voltage, sometimes referred to as a high voltage battery system. Having high voltage involves an operating voltage or difference in potential that is generally considered lethal if contacted by humans. High voltage as used herein means at least about 250 volt (V). Voltages specified herein are direct current (DC) voltages. In some implementations, a high voltage battery system can have a voltage of more than about 300 V. In some implementations, a high voltage battery system can have a voltage of more than about 400 V. In some implementations, a high voltage battery system can have a voltage of more than about 500 V. In some implementations, a high voltage battery system can have a voltage of more than about 600V. In some implementations, a high voltage battery system can have a voltage of more than about 700 V. In some implementations, a high voltage battery system can have a voltage of more than about 800V. In some implementations, a high voltage battery system can have a voltage of more than about 900 V. By contrast, a battery terminal or other conductive element that is considered acceptable also for service personnel without special high voltage tools or high voltage training can be referred to as having a non-lethal voltage. For example, making a high voltage battery system (e.g., one having a voltage of more than about 900 V) serviceable without special high voltage tools or high voltage training can involve ensuring that high voltage terminals are not exposed to service personnel, and that only terminals of a non-lethal voltage are exposed, to the service personnel.

Examples herein refer to electrochemical cells. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to a busbar, and a battery module can have at least one busbar. The busbar is electrically conductive and is used for conducting electricity to the electrochemical cells when charging, or from the cells when discharging. The busbar is made of an electrically conductive material (e.g., metal) and has suitable dimensions considering the characteristics of the electrochemical cells and the intended use. In some implementations, the busbar comprises aluminum (e.g., an aluminum alloy). A busbar can be planar (e.g., flat) or can have one or more bends, depending on the shape and intended use of the battery module.

Examples herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows an example of an electric vehicle (EV) 100 having a high-voltage (HV) battery system 102 with no standalone pack enclosure. The EV 100 is shown in an exploded view for illustrative purposes. The EV 100 and/or the HV battery system 102 can be used with one or more other examples described elsewhere herein. The EV 100 has one or more electric traction motors (not shown) to be powered by the HV battery system 102. Some other components of the vehicle 100 (including, but not limited to, wheels) are omitted in this illustration for clarity.

The EV 100 includes a vehicle body 104. The vehicle body 104 can include various structural components that together make up the framework and the multiple sections of the EV 100. In some implementations, the EV 100 includes a frame that is assembled from a number of individual sections. In some implementations, the EV 100 includes a chassis 106. For example, the chassis 106 can form the supporting structure for the vehicle body 104 and can be made using various frame components, rails, rockers, torque boxes, and/or cross-members.

The EV 100 has a cavity 108 in the vehicle body 104. The cavity 108 is here in part defined by an opening 110. The cavity 108 can be formed in any of various sections or portions of the vehicle body 104. In some implementations, the cavity 108 is formed in the chassis 106 of the vehicle body 104. For example, the cavity 108 can be configured so that the opening 110 faces toward ground on which the EV 100 is positioned.

The cavity 108 can have any shape, including, but not limited to, a rectilinear shape. In some implementations, the cavity is formed by a number of walls of the vehicle body 104. For example, the cavity 108 can at least in part be formed by a rear wall 112. As another example, the cavity 108 can at least in part be formed by a side wall 114 (obscured in the present illustration). As another example, the cavity 108 can at least in part be formed by a side wall 116 (obscured in the present illustration). As another example, the cavity 108 can at least in part be formed by a side wall 118. As another example, the cavity 108 can at least in part be formed by a side wall 120. The rear wall 112 can face (e.g., be substantially parallel with) the opening 110. One or more of the side walls 114-120 can be substantially perpendicular to the rear wall 112. A length dimension of the side walls 114-120 extending away from the opening 110 (e.g., a depth of the cavity 108) can have any relationship with a size dimension of the rear wall 112. In some implementations, this length dimension of the side walls 114-120 is substantially smaller than (e.g., less than 10% of) a width of the rear wall 112. For example, the cavity 108 can then be characterized as being relatively shallow. In other implementations, these dimensions instead have other proportions such that the cavity 108 can instead be characterized as being relatively deep. As such, the cavity 108 can be formed by at least five walls (e.g., the side walls 114-120, and the rear wall 112) of the vehicle body 104. The cavity 108 can have other shapes.

The HV battery system 102 can include multiple modules of electrochemical cells, sometimes referred to as battery cell collectors because each of them serves to contain multiple electrochemical cells. Here, the HV battery system 102 includes modules 122A-122D of electrochemical cells. The modules 122A-122D are components that comprise the HV battery system 102. The modules 122A-122D can be positioned in any arrangement within the cavity 108. For example, here, the module 122A is positioned nearest the front of the vehicle body 104; the module 122B is here positioned immediately rearward of the module 122A; the module 122C is positioned immediately rearward of the module 122B; and the module 122D is positioned immediately rearward of the module 122C. Each of the modules 122A-122D can be an individual unit that can be manufactured separately and installed in the cavity 108. For example, each of the modules 122A-122D can be mounted to (e.g., abutting) the rear wall 112.

Each of the modules 122A-122D includes multiple electrochemical cells. The electrochemical cells can have one or more of multiple form factors. In some implementations, the HV battery system 102 can use an electrochemical cell 124 having a cylinder shape. For example, the electrochemical cell 124 can have a center terminal at one end of the cell and a housing terminal that may be accessible at one or more other areas of the electrochemical cell 124. In some implementations, the HV battery system 102 can use an electrochemical cell 126 having a prismatic shape. For example, the electrochemical cell 126 can have terminals at one or more of its sides (e.g., at a side surface or at a main surface). Other form factors can be used.

The HV battery system 102 can include electrical interconnects to couple the modules 122A-122D to each other and/or to other electrical fittings within the cavity 108. Here, the HV battery system 102 includes electrical interconnects 128A-128C. The electrical interconnects 128A-128C are components that comprise the HV battery system 102. The electrical interconnects 128A-128C can serve one or more of multiple purposes. For example, the electrical interconnects 128A-128C can connect two or more of the modules 122A-122D to each other and thereby increase the overall voltage from a module-level voltage (e.g., a non-lethal voltage) to a battery system-level voltage (e.g., a lethal voltage). As another example, one or more of the electrical interconnects 128A-128C can be selectively removed (e.g., for a service session) so as to reduce the overall voltage from the battery system-level voltage to the module-level voltage.

Each of the electrical interconnects 128A-128C can include a busbar that is partially covered by insulation. For example, the electrical interconnect 128A includes a busbar that provides conductors 130, and also includes insulation 132 that partially covers the busbar. In some implementations, the electrical interconnect 128A can electrically connect the modules 122A-122B to each other. In some implementations, the electrical interconnect 128B can electrically connect the modules 122B-122C to each other. In some implementations, the electrical interconnect 128C can electrically connect the modules 122C-122D to each other.

The EV 100 includes a closure 134 that is configured for closing the opening 110 of the cavity 108. The closure 134 can include a member of metal and/or composite material. In some implementations, the closure 134 is in form of a sheet of material serving as a shield for the cavity 108. In some implementations, the closure 134 can have a non-planar geometry. The closure 134 can provide environmental protection and/or structural protection of the HV battery system 102. In some implementations, the closure 134 can provide structural reinforcement for the entire structure of the vehicle body 104. For example, the closure 134 can join together, and provide rigidity for, the whole of the bottom of the EV 100 (e.g., the chassis 106). In some implementations, the closure 134 both closes and seals the opening 110. For example, the closure 134 can include a sealing strip (e.g., of a flexible material) that interfaces with the opening 110.

The modules 122A-122D and the electrical interconnects 128A-128C can provide advantages relating to serviceability of the EV 100. For example, after removal of the closure 134, with the electrical interconnects 128A-128C remaining installed in their respective places, no high voltage terminal of the HV battery system 102 is exposed to the technician. Rather, the insulation of the electrical interconnects 128A-128C serves to cover, and thereby prevent inadvertent contact with, high voltage terminals or other conductors. Service personnel can then remove one or more of the electrical interconnects 128A-128C. Any of multiple ways of removal can be used. In some implementations, the electrical interconnects 128A-128C can be removed by way of grasping the insulated portion of, and pulling on, the respective electrical interconnect 128A-128C. In some implementations, the electrical interconnects 128A-128C can be removed by rotating or otherwise moving a component. For example, a screw of a plastic material can be surrounded by insulation such that the removal can be performed using a conventional screwdriver and no specialty tools.

Removal of the electrical interconnect severs the electrical connection between the corresponding ones of the modules 122A-122D and thereby reduces the voltage from a system voltage level (e.g., a lethal voltage) to a module-level voltage (e.g., a non-lethal voltage). The present subject matter can make the HV battery system 102 "finger safe" in that it allows the HV battery system 102 to be serviced without special high voltage tools or high voltage training. That is, the HV battery system 102 is disconnected to be a fraction of the complete battery system voltage before any of the modules 122A-122D can be accessed for service. For example, each of the modules 122A-122D has a voltage lower than the voltage of the HV battery system 102.

Figure 2:
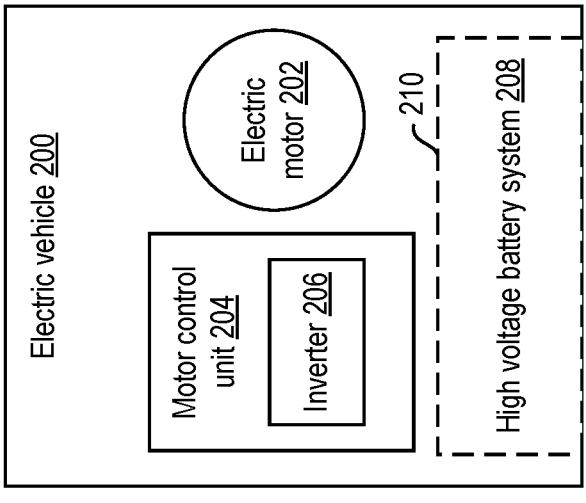
FIG. 2 schematically shows an example of an EV.

FIG. 2 schematically shows an example of an EV 200. The EV 200 can be used with one or more other examples described elsewhere herein. The EV 200 includes at least one electric motor 202 for traction. For example, the electric motor(s) 202 can be mounted to a frame of the EV 200. The electric motor 202 can be any type of electric motor, including, but not limited to, a permanent-magnet motor, an induction motor, a synchronous motor, or a reluctance motor. The EV 200 can include a motor control unit 204 which can execute software (e.g., firmware) for controlling the electric motor 202. In some implementations, the motor control unit 204 can control an inverter 206 providing electricity to the electric motor 202. For example, the motor control unit 204 can include a microprocessor or field-programmable logic array.

The EV 200 includes a high voltage battery system 208 that is mounted to a vehicle body of the EV 200 inside a cavity 210. The high voltage battery system 208 has no standalone pack enclosure, as schematically illustrated by the cavity 210 being shown using a dashed line.

The EV 200 is an example of an EV that includes: a vehicle body (e.g., the vehicle body 104 in FIG. 1); a cavity in the vehicle body (e.g., the cavity 210), the cavity formed by at least one wall of the vehicle body (e.g., one or more of the rear wall 112, side walls 114, 116, 118, or 120 in FIG. 1) and by an opening in the vehicle body (e.g., the opening 110 in FIG. 1); a closure (e.g., the closure 134 in FIG. 1) configured for closing the opening; an electric motor (e.g., the electric motor(s) 202) for propulsion of the electric vehicle; and components that comprise a high voltage battery system (e.g., the high voltage battery system 208), the components mounted to the vehicle body inside the cavity, the high voltage battery system including electrochemical cells (e.g., the electrochemical cells 124 or 126 in FIG. 1) powering the electric motor, the high voltage battery system being enclosed by the wall of the vehicle body and the closure and having no standalone pack enclosure.

Figure 3:
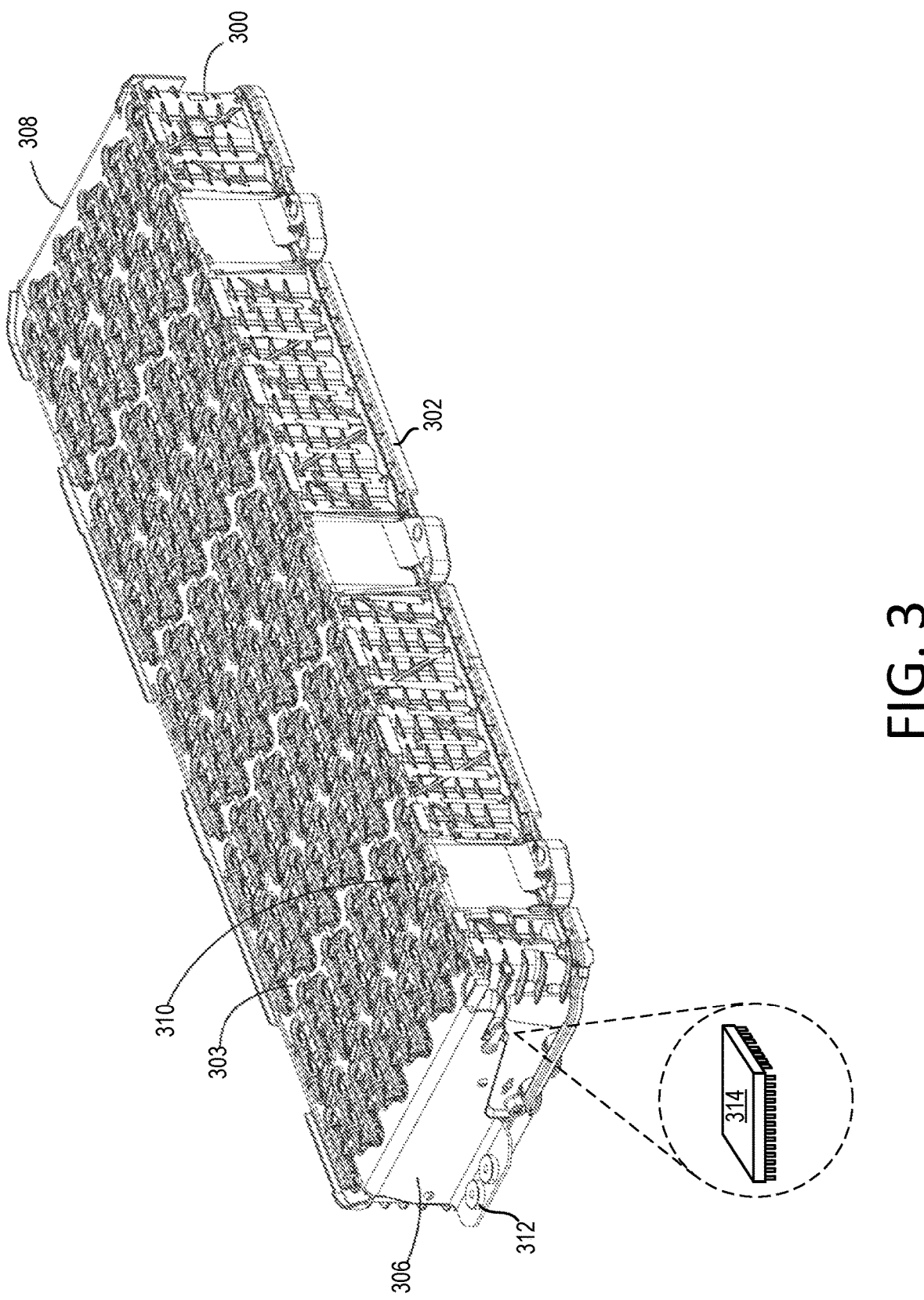
FIG. 3 shows an example of a module for electrochemical cells that can be used with a battery system having no standalone pack enclosure.

FIG. 3 shows an example of a module 300 for electrochemical cells that can be used with a battery system having no standalone pack enclosure. The module 300 can be used with one or more other examples described elsewhere herein. For example, any of the modules 122A-122D in FIG. 1 can be the module 300. As another example, the module 300 can be part of components that comprise an HV battery system.

The module 300 here includes a housing 302 that contains the electrochemical cells. The housing 302 can be made of a nonconductive material, such as a thermoplastic or thermosetting substance. For example, a polymer material, including, but not limited to, polycarbonate can be used in molding the housing 302.

The module 300 here includes a planar busbar 303, an end busbar 306, and an end busbar 308 at an opposite end of the housing 302 from the end busbar 306. The end busbars 306 and 308 are each electrically coupled to the planar busbar 303 or portions thereof. The housing 302 can have openings 310 into its interior. In some implementations, one or more bonds to terminals of the electrochemical cells can be formed through at least one of the openings 310.

The planar busbar 303 and the end busbars 306 and 308 can be made of the same or a different conductive material. For example, aluminum or an aluminum alloy can be used. The end busbar 306 can position at least one electrical terminal 312 adjacent the housing 302. In some implementations, the electrical terminal 312 can be accessible to one or more of the electrical interconnects 128A-128D in FIG. 1. In some implementations, any of the conductors 130 in FIG. 1 can touch the electrical terminal 312 when the corresponding one of the electrical interconnects 128A-128D is installed, and thereby connect the electrical terminal 312 to another conductive component (e.g., a corresponding electrical terminal of another module). The electrical terminal 312 can be considered a high voltage terminal of the battery system when the electrical interconnect is installed, and the insulation of the electrical interconnect then prevents the service personnel from inadvertently contacting high voltage terminals. By contrast, when the electrical interconnect is removed from its installed position so that the conductor 130 is no longer in contact, the electrical terminal 312 can instead be a module-level voltage (e.g., a non-lethal voltage) terminal of the module 300, such as a low-voltage terminal.

The module 300 can include circuitry 314 for managing the charging, storage, and/or use of electrical energy in the electrochemical cells. For example, the circuitry 314 can include a battery management system implemented as an integrated circuit installed on a printed circuit board. In some implementations, the module 300 can instead be controlled by an external component (e.g., circuitry that is common to the entire HV battery system).

A number of examples will now be described to illustrate some of the various possibilities for arranging a module within a cavity of a vehicle body.

Figure 4A:
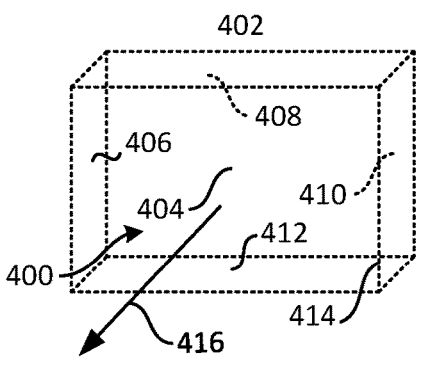
FIG. 4A schematically shows an example of a cavity in a vehicle body.

FIG. 4A schematically shows an example of a cavity 400 in a vehicle body 402. The vehicle body 402 comprises the surroundings of the cavity 400 which is shown with a dashed outline, and no details of the vehicle body 402 are shown. The cavity 400 is here formed by a rear wall 404; side wall 406, side wall 408 (obscured in the present illustration), side wall 410 (obscured in the present illustration), and side wall 412 that are substantially perpendicular to the rear wall 112; and an opening 414. That is, the opening 414 is defined by respective edges of the side walls 406-412.

The opening 414 can be a substantially planar area. A normal direction of the opening 414 can be indicated by an arrow 416. That is, the arrow 416 is perpendicular to the opening 414. In the following, some examples will be given with reference to the arrow 416.

Figure 4B:
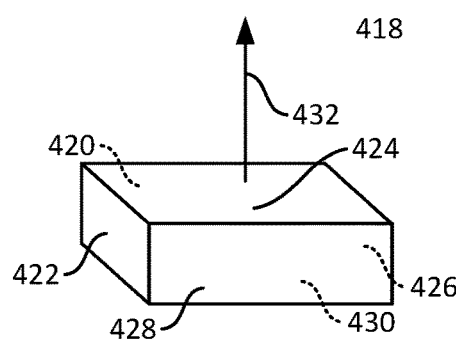
FIG. 4B schematically shows an example of a module for electrochemical cells.

FIG. 4B schematically shows an example of a module 418 for electrochemical cells. The module 418 can have a substantially rectilinear shape. Here, the module 418 is bounded by its surfaces that include a rear wall 420 (obscured in the present illustration), a side wall 422, a top wall 424, a side wall 426 (obscured in the present illustration), a front wall 428, and a bottom wall 430 (obscured in the present illustration).

The top wall 424 and the bottom wall 430 are here opposing each other (e.g., substantially parallel) and are relatively larger than the other surfaces of the module 418. The top wall 424 and the bottom wall 430 may therefore be referred to as main surfaces of the module 418. A normal direction of the top wall 424 and/or the bottom wall 430 can be indicated by an arrow 432. That is, the arrow 432 is perpendicular to the top wall 424 and the bottom wall 430. Some examples will now be given with reference to the arrow 432.

Figure 4C:
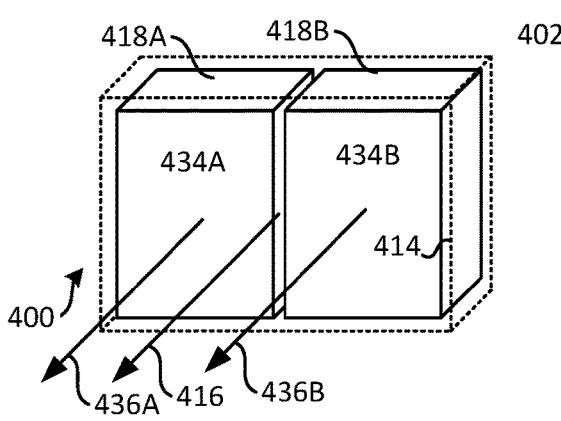
FIG. 4C schematically shows an example of modules for electrochemical cells being positioned in a cavity in a vehicle body.

FIG. 4C schematically shows an example of modules 418A and 418B for electrochemical cells being positioned in the cavity 400 in the vehicle body 402. The modules 418A and 418B are two instances of the module 418 in FIG. 4B. The module 418A here has a main surface 434A, and the module 418B here has a main surface 434B. A normal direction of the main surface 434A can be indicated by an arrow 436A, and a normal direction of the main surface 434B can be indicated by an arrow 436B. The normal directions of each of the main surfaces 434A-434B are substantially parallel with the normal direction of the opening 414 in the vehicle body 402 as indicated by the arrow 416. For example, the modules 418A and 418B are mounted side by side within the cavity 400 with their main surfaces 434A-434B substantially aligned with each other.

Figure 4D:
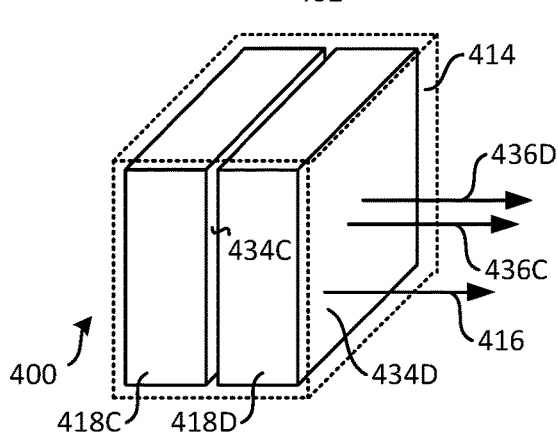
FIG. 4D schematically shows an example of modules for electrochemical cells being positioned in a cavity in a vehicle body.

FIG. 4D schematically shows an example of modules 418C and 418D for electrochemical cells being positioned in the cavity 400 in the vehicle body 402. The modules 418C and 418D are two instances of the module 418 in FIG. 4B. The module 418C here has a main surface 434C, and the module 418D here has a main surface 434D. A normal direction of the main surface 434C can be indicated by an arrow 436C, and a normal direction of the main surface 434D can be indicated by an arrow 436D. The normal directions of each of the main surfaces 434C-434D are substantially parallel with the normal direction of the opening 414 in the vehicle body 402 as indicated by the arrow 416. For example, the modules 418A and 418B are stacked within the cavity 400 with their main surfaces 434C-434D substantially facing each other.

Figure 4E:
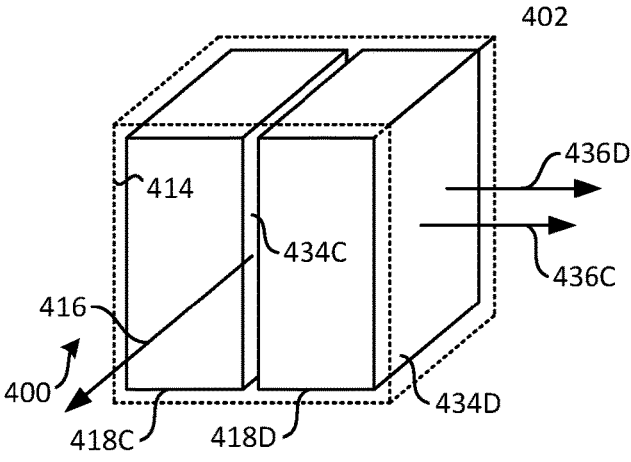
FIG. 4E schematically shows an example of modules for electrochemical cells being positioned in a cavity in a vehicle body.

FIG. 4E schematically shows an example of the modules 418C and 418D for electrochemical cells being positioned in the cavity 400 in the vehicle body 402. The normal direction of the main surface 434C can be indicated by the arrow 436C, and the normal direction of the main surface 434D can be indicated by the arrow 436D. The normal directions of each of the main surfaces 434C-434D are not substantially parallel with the normal direction of the opening 414 in the vehicle body 402 as indicated by the arrow 416. For example, the normal directions of each of the main surfaces 434C-434D are substantially perpendicular to the normal direction of the opening 414 in the vehicle body 402 as indicated by the arrow 416. The modules 418A and 418B are here stacked within the cavity 400 with their main surfaces 434C-434D substantially facing each other.

The illustrations in FIGS. 4A-4E are not necessarily shown in a side view, or even from a common direction. One or more of the illustrations in FIGS. 4A-4E can be a side view, a top view, a bottom view, a front view, or a rear view, to name just a few examples.

Figure 5:
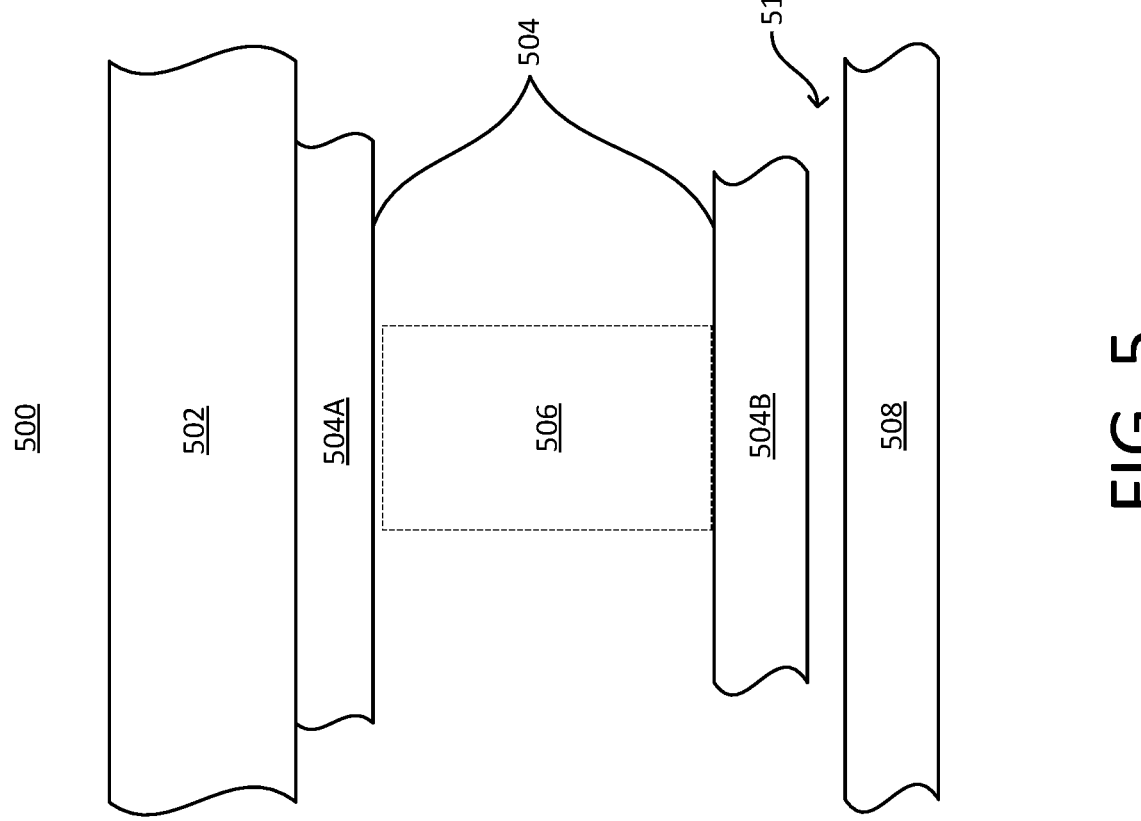
FIG. 5 shows an example of a cross-section of a vehicle body, a module of a HV battery system, an electrochemical cell, and a closure.

FIG. 5 shows an example of a cross-section 500 of a vehicle body 502, a module 504 of a HV battery system, an electrochemical cell 506, and a closure 508. The cross-section 500 can be used with one or more other examples described elsewhere herein. The vehicle body 502, module 504, and the closure 508 are here truncated for simplicity. The module 504 can be attached to the vehicle body 502. In some implementations, this can be done to install any of the modules 122A-122D in FIG. 1 within the cavity 108. For example, a portion 504A of the module 504 here abuts the vehicle body 502 and may be fastened to the vehicle body 502. The electrochemical cell 506 is contained by and held in place within the module 504. In some implementations, this can be done using the housing 302 in FIG. 3. For example, another portion 504B of the module 504 may serve as another confining structure for the electrochemical cell 506 (e.g., for attachment and/or cooling). A gap 510 can exist between the closure 508 and the module 504. For example, the gap 510 can separate the electrochemical cell 506 from the closure 508. In some implementations, the gap 510 can be omitted. For example, the closure 508 can be mechanically joined to the module 504.

Figure 6:
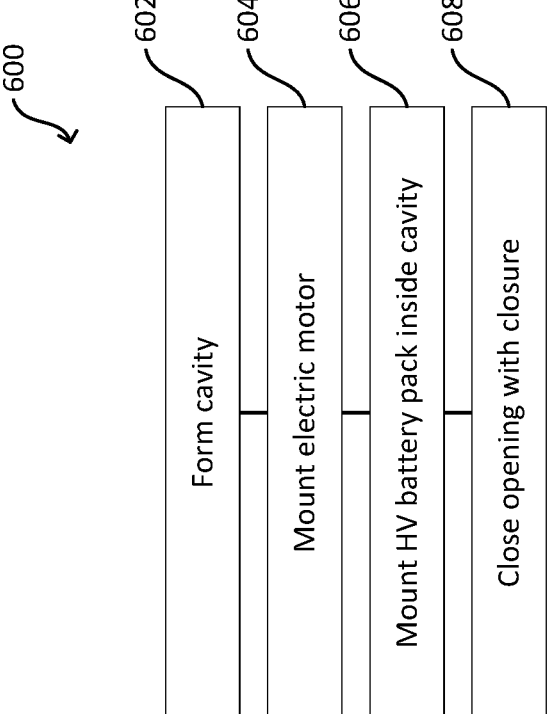
FIG. 6 shows an example of a method.

FIG. 6 shows an example of a method 600. The method 600 can be used with one or more other examples described elsewhere herein. More or fewer operations than shown can be performed. Two or more operations can be performed in a different order unless otherwise indicated. The method 600 is an example of a method of manufacturing an EV.

Operation 602 can involve forming a cavity in a vehicle body by at least one wall of the vehicle body and by an opening in the vehicle body. For example, the cavity 108 in FIG. 1 can be formed by the side walls 114-120, the rear wall 112, and the opening 110.

Operation 604 can involve mounting an electric motor to the electric vehicle for propulsion of the electric vehicle. For example, the electric motor(s) 202 in FIG. 2 can be mounted to the frame of the EV 100 in FIG. 1.

Operation 606 can involve mounting a high voltage battery system to the vehicle body inside the cavity. For example, the HV battery system 102 in FIG. 1 can be mounted to the vehicle body 104. The high voltage battery system includes electrochemical cells (e.g., the electrochemical cells 124 or 126) for powering the electric motor.

Operation 608 can involve closing the opening with a closure, the high voltage battery system being enclosed by the wall of the vehicle body and the closure and having no standalone pack enclosure. In some implementations, the closure 134 in FIG. 1 can be fitted onto the vehicle body 104 so as to close the opening 110.

Figure 7:
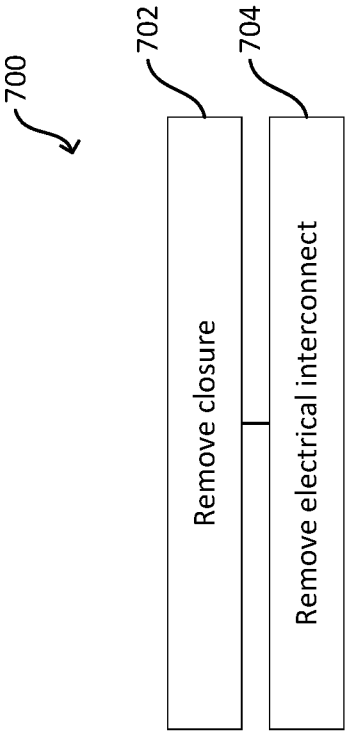
FIG. 7 shows an example of a method.

FIG. 7 shows an example of a method 700. The method 700 can be used with one or more other examples described elsewhere herein. More or fewer operations than shown can be performed. Two or more operations can be performed in a different order unless otherwise indicated. The method 700 is an example of a method of servicing an EV.

Operation 702 can involve removing a closure that closes an opening in a vehicle body of the electric vehicle. For example, the closure 134 in FIG. 1 can be removed from the vehicle body 104 so as to expose the opening 110. A cavity has been formed in the vehicle body by the opening and at least one wall of the vehicle body. For example, the cavity 108 in FIG. 1 can be formed by the side walls 114-120, the rear wall 112, and the opening 110. A high voltage battery system is mounted to the vehicle body inside the cavity. For example, the HV battery system 102 in FIG. 1 can be mounted to the vehicle body 104. The high voltage battery system comprises at least first and second modules of electrochemical cells. For example, the HV battery system 102 in FIG. 1 can include two or more of the modules 122A-122D.

Operation 704 can involve removing from the high voltage battery system an electrical interconnect that electrically connects the first and second modules to each other. For example, any of the electrical interconnects 128A-128C in FIG. 1 can be removed. The electrical interconnect can be removed by pulling while grasping an insulated portion of the electrical interconnect. For example, the service personnel can grasp the insulation 132 (or another insulated portion) with a hand or a tool. The electrical interconnect can be removed by rotating or otherwise moving a component. High voltage terminals of the high voltage battery system are not exposed to the service personnel before or after removal of the electrical interconnect. After removal of the electrical interconnect only terminals of the high voltage battery system having a fraction of the complete battery system voltage are exposed to the service personnel.

After the servicing has been completed, the electrical interconnect can then be installed, and subsequently the closure can be installed to close the opening.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electric vehicle comprising:
   a vehicle body;
   a cavity in the vehicle body, the cavity formed by at least one wall of the vehicle body and by an opening in the vehicle body;
   a closure configured for closing the opening;
   an electric motor for propulsion of the electric vehicle; and
   components that comprise a high voltage battery system, the components mounted to the vehicle body inside the cavity, the high voltage battery system including electrochemical cells powering the electric motor, the high voltage battery system being enclosed by the wall of the vehicle body and the closure and having no standalone pack enclosure;
   wherein the high voltage battery system comprises first and second modules of electrochemical cells, and an electrical interconnect that electrically connects the first and second modules to each other until being removed by pulling on the electrical interconnect, and wherein the electrical interconnect comprises a busbar partially covered by insulation.

2. The electric vehicle of claim 1, wherein each of the first and second modules has a fraction of a high voltage of the high voltage battery system.

3. The electric vehicle of claim 1, wherein each of the first and second modules includes circuitry controlling the electrochemical cells of the respective first or second module.

4. The electric vehicle of claim 1, wherein each of the first and second modules has a rectilinear shape with main surfaces of the rectilinear shape opposing each other, wherein normal directions of each of the main surfaces are substantially parallel with a normal direction of the opening in the vehicle body.

5. The electric vehicle of claim 4, wherein the first and second modules are mounted side by side within the cavity with their main surfaces substantially aligned with each other.

6. The electric vehicle of claim 4, wherein the first and second modules are stacked within the cavity with their main surfaces substantially facing each other.

7. The electric vehicle of claim 1, wherein each of the first and second modules has a rectilinear shape with main surfaces of the rectilinear shape opposing each other, wherein normal directions of each of the main surfaces are not substantially parallel with a normal direction of the opening in the vehicle body.

8. The electric vehicle of claim 7, wherein the normal directions of each of the main surfaces are substantially perpendicular to the normal direction of the opening in the vehicle body.

9. The electric vehicle of claim 8, wherein the first and second modules are stacked within the cavity with their main surfaces substantially facing each other.

10. The electric vehicle of claim 1, wherein the cavity is formed by at least five walls of the vehicle body.

11. The electric vehicle of claim 10, wherein the five walls include a rear wall facing the opening, and four side walls substantially perpendicular to the rear wall.

12. The electric vehicle of claim 1, wherein the opening faces toward ground on which the electric vehicle is positioned.

13. The electric vehicle of claim 1, further comprising a gap separating the electrochemical cells from the closure.

14. A method of manufacturing an electric vehicle, the method comprising:

forming a cavity in a vehicle body by at least one wall of the vehicle body and by an opening in the vehicle body;

mounting an electric motor to the electric vehicle for propulsion of the electric vehicle;

mounting components that comprise a high voltage battery system to the vehicle body inside the cavity, the high voltage battery system including electrochemical cells for powering the electric motor, wherein mounting the components to the vehicle body inside the cavity comprises:

mounting first and second modules of electrochemical cells inside the cavity; and installing an electrical interconnect that electrically connects the first and second modules to each other until being removed by pulling on the electrical interconnect, wherein the electrical interconnect comprises a busbar partially covered by insulation; and closing the opening with a closure, the high voltage battery system being enclosed by the wall of the vehicle body and the closure and having no standalone pack enclosure.

15. A method of servicing an electric vehicle, the method comprising:

removing a closure that closes an opening in a vehicle body of the electric vehicle, a cavity in the vehicle body formed by the opening and at least one wall of the vehicle body, wherein components that comprise a high voltage battery system are mounted to the vehicle body inside the cavity, the high voltage battery system comprising at least first and second modules of electrochemical cells; and removing from the high voltage battery system an electrical interconnect that electrically connects the first and second modules to each other until being removed by pulling on the electrical interconnect, wherein the electrical interconnect comprises a busbar partially covered by insulation, and wherein removing the electrical interconnect comprises pulling while grasping an insulated portion of the electrical interconnect.

16. The method of claim 15, further comprising:

subsequently installing the electrical interconnect to electrically connect the first and second modules to each other; and after subsequently installing the electrical interconnect, closing the opening with the closure.

\* \* \* \* \*